(12) United States Patent
Watanabe (10) Patent No.: US 9,711,982 B2
(45) Date of Patent: Jul. 18, 2017

(54) INFORMATION NOTIFYING DEVICE (71) Applicant: Panasonic Intellectual Property Management Co., Ltd., Osaka (JP)

(72) Inventor: Kou Watanabe, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/014,635

(22) Filed: Feb. 3, 2016

(65) Prior Publication Data

US 2016/0285294 A1 Sep. 29, 2016

(30) Foreign Application Priority Data

Mar. 23, 2015 (JP) .................................. 2015-059022
Dec. 18, 2015 (JP) .................................. 2015-246830

(51) Int. Cl.
*G08B 21/00* (2006.01)
*H02J 7/00* (2006.01)
*G08B 21/24* (2006.01)

(52) U.S. Cl.
CPC ............ *H02J 7/0047* (2013.01); *G08B 21/24* (2013.01); *H02J 2007/005* (2013.01)

(58) Field of Classification Search
None
See application file for complete search history.

(56) References Cited

U.S. PATENT DOCUMENTS

| | | | |
|---|---|---|---|
| 6,295,002 B1 | 9/2001 | Fukuda | |
| 8,423,219 B2* | 4/2013 | Tofukuji | ............... B60L 11/185 180/65.245 |
| 2007/0178838 A1 | 8/2007 | Matsuda | |
| 2011/0254692 A1* | 10/2011 | Furuta | ................. H04M 1/7253 340/636.1 |
| 2012/0290506 A1* | 11/2012 | Muramatsu | ........ G01C 21/3469 705/412 |
| 2014/0125279 A1* | 5/2014 | Juhasz | ................. H02J 7/0013 320/109 |

(Continued)

FOREIGN PATENT DOCUMENTS

| | | |
|---|---|---|
| JP | 2000-332644 A | 11/2000 |
| JP | 2007-208697 A | 8/2007 |

(Continued)

*Primary Examiner* — Julie Lieu
(74) *Attorney, Agent, or Firm* — McDermott Will & Emery LLP (57) ABSTRACT

An information notifying device in accordance with the present disclosure includes a first communication circuit, a second communication circuit, a clock, and a controller. The first communication circuit receives first information regarding an estimated arrival time at which transportation equipment will arrive at a destination. The second communication circuit receives second information regarding a remaining battery capacity of a battery installed in an external device. The clock keeps a current time. The controller calculates a first charging time necessary to charge the external device to a fully charged state based on the second information, and outputs information prompting to charge the external device at a first timing based on the first information, the current time and the first charging time.

16 Claims, 5 Drawing Sheets

(56) References Cited

U.S. PATENT DOCUMENTS

| | | | |
|---|---|---|---|
| 2014/0278166 A1 | 9/2014 | Takahashi | |
| 2015/0298565 A1* | 10/2015 | Iwamura | B60L 11/1844 |
| | | | 701/22 |
| 2015/0321570 A1* | 11/2015 | Cun | B60L 11/1803 |
| | | | 705/34 |
| 2016/0052413 A1* | 2/2016 | Shimizu | B60L 11/184 |
| | | | 700/291 |
| 2016/0107534 A1* | 4/2016 | Ikeda | B60L 11/1816 |
| | | | 307/9.1 |

FOREIGN PATENT DOCUMENTS

| | | |
|---|---|---|
| JP | 2011-169632 A | 9/2011 |
| JP | 2011-223512 A | 11/2011 |
| JP | 2012-242174 A | 12/2012 |
| JP | 2013-251993 A | 12/2013 |

\* cited by examiner

INFORMATION NOTIFYING DEVICE

RELATED APPLICATIONS

This application is based upon and claims the benefit of priority to Japanese Patent Application No. 2015-059022, filed on Mar. 23, 2015, and Japanese Patent Application No. 2015-246830, filed on Dec. 18, 2015, which are incorporated herein by reference in their entirety.

BACKGROUND

1. Technical Field

The present disclosure relates to an information notifying device which is used in transportation equipment such as a passenger airplane or the like to notify a passenger of information for charging an external device.

2. Description of the Related Art

Unexamined Japanese Patent Publication No. 2011-169632 discloses a mobile terminal which determines that a remaining capacity of its battery would be reduced to be equal to or lower than a specified level by an estimated destination arrival time, and displays a message for advising a user to charge the battery.

SUMMARY

An information notifying device in accordance with the present disclosure includes a first communication circuit, a second communication circuit, a clock, and a controller. The first communication circuit receives first information regarding an estimated arrival time at which transportation equipment will arrive at a destination. The second communication circuit receives second information regarding a remaining capacity of a battery installed in an external device. The clock keeps a current time. The controller calculates a first charging time necessary to fully charge the external device based on the second information, and outputs information prompting to charge the external device at a first timing based on the first information, the current time and the first charging time.

DETAILED DESCRIPTION

Hereinafter, exemplary embodiments will be described in detail with reference to the drawings appropriately. However, unnecessarily detailed description may occasionally be omitted. For example, detailed description of well-known matters and redundant description of substantially the same configurations may occasionally be omitted. Such omission is to avoid the following description from becoming unnecessarily redundant, and to allow any person skilled in the art to easily understand the description.

Also, it should be noted that the following description and the accompanying drawings are provided to allow any person skilled in the art to fully understand the present disclosure, and that it is not intended to limit the subject matter described in the claims by the following description and the accompanying drawings.

First Exemplary Embodiment

Hereinafter, a first exemplary embodiment will be described with reference to FIGS. 1 to 4.

An information notifying device in accordance with the present exemplary embodiment is used in a situation in which a user uses transportation equipment such, for example, as an automobile, an airplane, a railway train, a bus or a passenger ship, and notifies the user of information regarding a timing for charging a chargeable external device such, for example, as a smart phone, a tablet terminal or a laptop computer, which is brought into the transportation equipment from the outside by the user. The following description will be made taking a smart phone as an example of the external device.

1-1. Configuration

Figure 1:
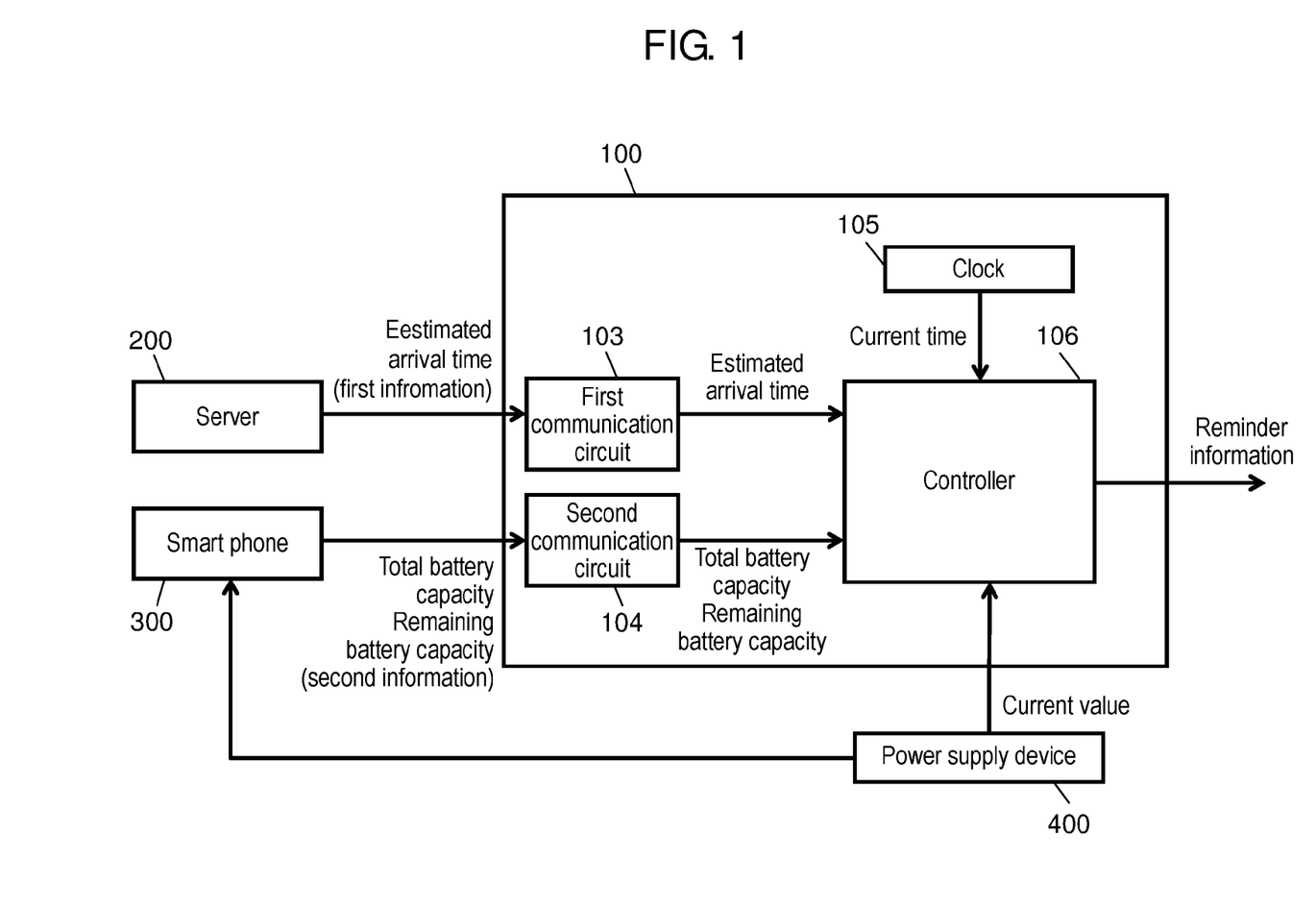
FIG. 1 is a block diagram illustrating an electrical configuration of an information notifying device in accordance with a first exemplary embodiment.

FIG. 1 is a block diagram illustrating an electrical configuration of information notifying device 100 in accordance with the present exemplary embodiment. Information notifying device 100 includes first communication circuit 103, second communication circuit 104, clock 105, and controller 106. Information notifying device 100 is connected by using a wired connection to server 200 provided in the transportation equipment. Also, information notifying device 100 is connectable by using a wireless connection to smart phone 300 carried by a user. Also, smart phone 300 can be charged by being connected to power supply device 400 provided in the transportation equipment.

Server 200

Server 200 is carried onboard the transportation equipment. Server 200 obtains information regarding an estimated time at which the transportation equipment will arrive at a destination (an estimated arrival time) from a navigation system (not shown) which monitors and controls time and route information involved in the transportation operation of the transportation equipment. Server 200 is connected to information notifying device 100 by using a wired connection so as to be able to communicate with information notifying device 100. Server 200 outputs, as first information, the obtained information of the estimated arrival time to first communication circuit 103.

The navigation system estimates the destination arrival time based on location information and route information of the transportation equipment and/or moving speed information of the transportation equipment and the like. The location information of the transportation equipment can be obtained by using such functions possessed by the transportation equipment as the GPS (Global Positioning System) function and the communication function such, for example, as a telephone line and a wireless LAN. The route information may be, for example, information indicating a traffic congestion situation of the moving route provided by VICS (Registered Trademark) (Vehicle Information and Communication System). The information source from which server 200 obtains the estimated arrival time may not be limited to the navigation system. Server 200 may obtain the estimated arrival time from another server or the like which has only an operation schedule table of the transportation equipment.

Smart Phone 300

Smart phone 300 is a mobile terminal which can be driven by a built-in battery. Smart phone 300 can be recharged by being supplied with power from power supply device 400 provided in the transportation equipment. Smart phone 300 keeps, as second information, system information including total battery capacity information showing a total capacity of the installed battery and remaining battery capacity information showing a currently remaining capacity of the battery. Smart phone 300 can output the second information to second communication circuit 104.

Power Supply Device 400

Power supply device 400 is provided in the transportation equipment, and supplies power to each part in the transportation equipment. Power supply device 400 notifies controller 106 of information notifying device 100 of a current value which is information of a current that can be supplied by power supply device 400. Also, power supply device 400 can supply power to smart phone 300 by being connected to smart phone 300 by using a wired connection. It should be noted that the method of supplying power from power supply device 400 to smart phone 300 may not necessarily use the wired connection, and may be a method using a wireless power transmission technique such, for example, as electromagnetic induction or magnetic resonance. Power supply device 400 is an example of a first power supply. The current value is an example of first power information which is information regarding a capability of supplying power to an external device.

First Communication Circuit 103

First communication circuit 103 is connected to server 200 by using a wired connection, and receives an output from server 200. First communication circuit 103 receives, as the first information, the estimated destination arrival time output from server 200.

Second Communication Circuit 104

Second communication circuit 104 is a wireless communication module which performs a wireless communication to smart phone 300. Second communication circuit 104 receives, as the second information, the total battery capacity information and the remaining battery capacity information.

Clock 105

Clock 105 keeps a current time. Clock 105 outputs the current time to controller 106. It is preferable that the current time held by clock 105 is synchronized with a current time of each of server 200 and the navigation system.

Controller 106

Figure 2:
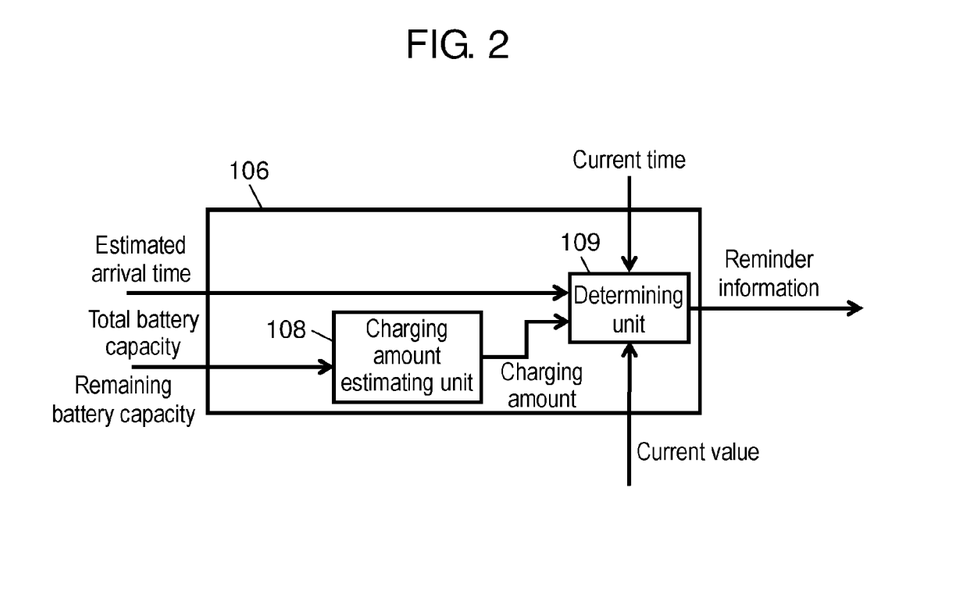
FIG. 2 is a diagram schematically illustrating functional blocks of a controller in accordance with the first exemplary embodiment.

Controller 106 performs overall control of the entire information notifying device 100. Controller 106 includes a memory (not shown) inside. Controller 106 executes programs stored in the memory to realize various functions. FIG. 2 is a diagram schematically illustrating functional blocks of controller 106 in accordance with the present exemplary embodiment. As shown in FIG. 2, controller 106 includes charging amount estimating unit 108, and determining unit 109. In other words, controller 106 executes programs to operate as charging amount estimating unit 108 and determining unit 109. Controller 106 outputs such information that prompts the user to charge smart phone 300 at a timing (a first timing) based on the first information, the second information, the current time and the current value.

Charging amount estimating unit 108 estimates a charging amount necessary to recover a fully charged state based on the total battery capacity information and the remaining battery capacity information which are received from second communication circuit 104, and outputs the estimated charging amount to determining unit 109. Determining unit 109 outputs reminder information prompting the user to begin charging smart phone 300 based on information of the estimated arrival time received from first communication circuit 103, the current time received from clock 105, the current value received from power supply device 400, and the charging amount received from charging amount estimating unit 108.

Figure 3:
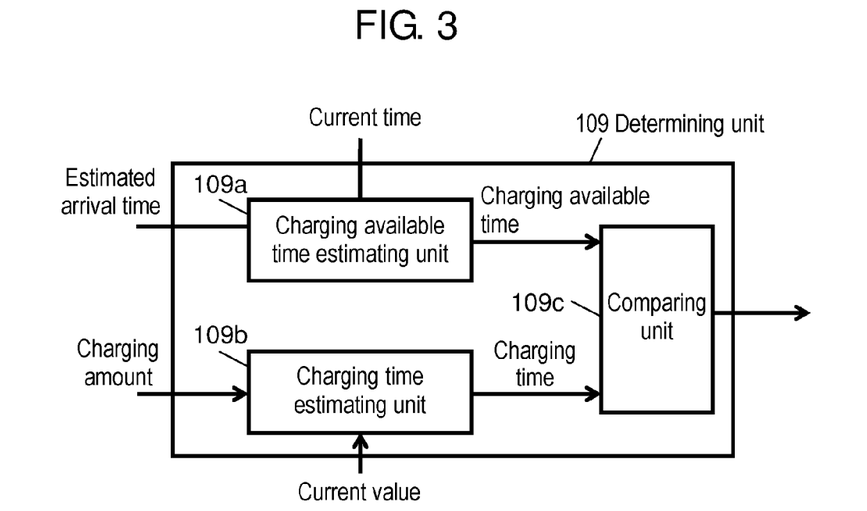
FIG. 3 is a diagram schematically illustrating functional blocks of a determining unit in accordance with the first exemplary embodiment.

FIG. 3 is a diagram schematically illustrating functional blocks of determining unit 109 in accordance with the present exemplary embodiment. As shown in FIG. 3, determining unit 109 includes charging available time estimating unit 109*a*, charging time estimating unit 109*b*, and comparing unit 109*c*. Charging available time estimating unit 109*a* estimates a time within which charging is available before arrival based on the current time output from clock 105 and the estimated arrival time output from first communication circuit 103, and outputs the estimated result, as charging available time information, to comparing unit 109*c*. The charging available time can be obtained by calculating a difference between the estimated arrival time and the current time.

Charging time estimating unit 109*b* estimates a charging time based on the charging amount information output from charging amount estimating unit 108 and the current value notified from power supply device 400. The charging time is a time necessary to charge the battery of smart phone 300 to the fully charged state by supplying a current indicated by the current value. Here, a maximum value of power that can be supplied by power supply device 400 may be used instead of the current value.

Comparing unit 109*c* compares the charging available time information output from charging available time estimating unit 109*a* and the charging time information output from charging time estimating unit 109*b*, and monitors so that the charging time does not become longer than the charging available time. Also, comparing unit 109*c* outputs the reminder information notifying the user of an advice to begin charging at a timing (a first timing) before a time at which the charging time will exceed the charging available time. In other words, controller 106 calculates a charging time necessary to charge smart phone 300 to the fully charged state based on the total battery capacity information and the remaining battery capacity information (the second information), and the current value, and determines the first timing based on the estimated arrival time (the first information), the current time, and the charging time.

The reminder information is information notifying the user of necessity to begin charging. The reminder information may be output in any form as far as it is recognized by the user. For example, the reminder information may be displayed as characters and/or figures on a monitor installed in the transportation equipment. Also, the reminder information may be notified to the user as a sound output from a speaker, as light output from a lighting device or an indicator lamp, or as vibration output from a vibrator. Also, the reminder information may be notified to the user by transmitting the reminder information to smart phone 300 so as to notify the user of the information by using smart phone 300, without adopting a notification method using a device installed in the transportation equipment.

1-2. Operations

Next, an operation of information notifying device 100 of the present exemplary embodiment will be described.

Figure 4:
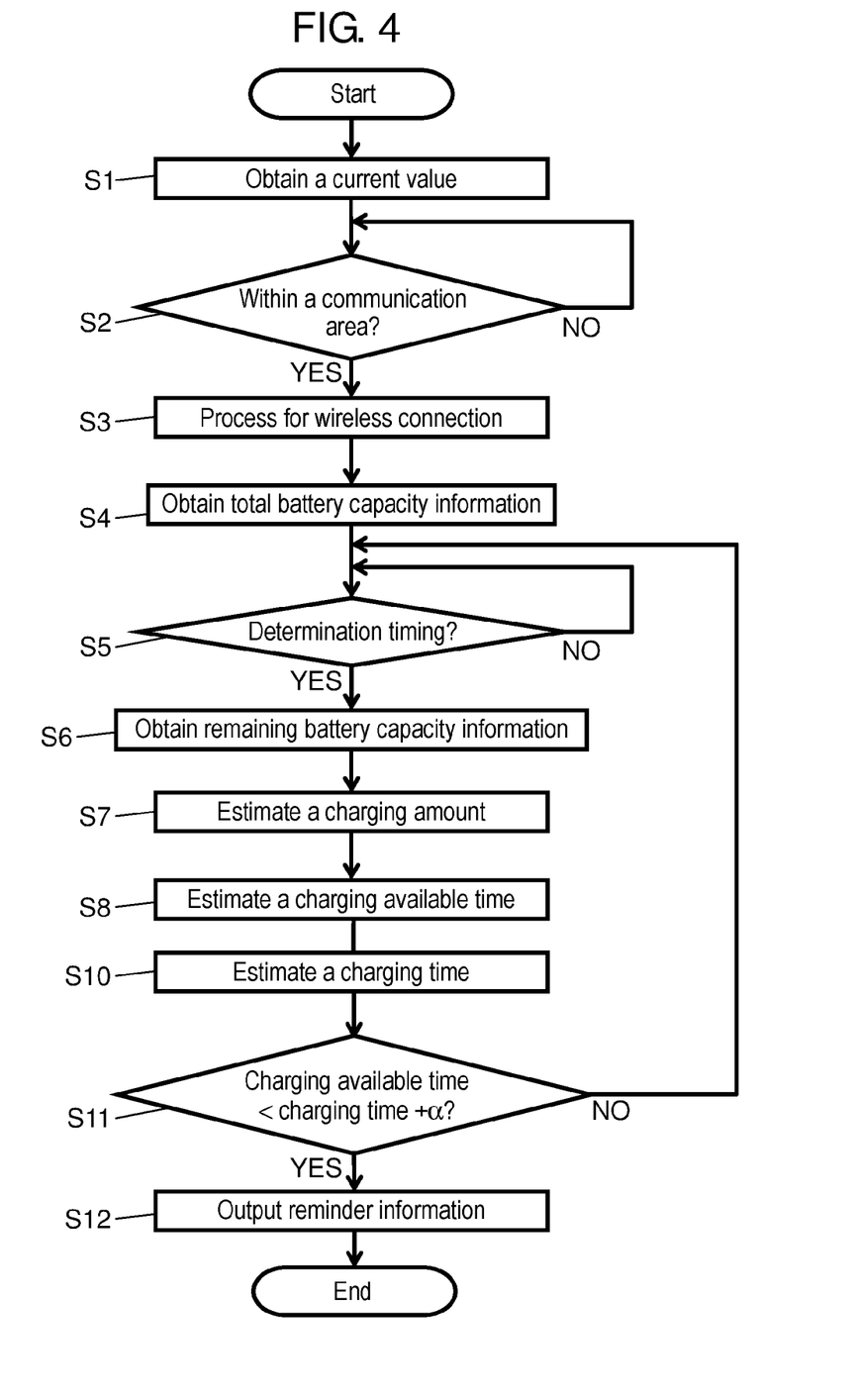
FIG. 4 is a flowchart illustrating operations of the information notifying device in accordance with the first exemplary embodiment.

FIG. 4 is a flowchart illustrating an operation of information notifying device 100 in accordance with the present exemplary embodiment. Controller 106 obtains from power supply device 400 a current value of a current which can be supplied by power supply device 400 (S1). Generally, a chargeable electronic device such as smart phone 300 is charged at a predetermined voltage. In case, for example, of a USB device that is charged by using a USB cable, the maximum current is required to be 500 mA (USB 2.0). In case of the present exemplary embodiment, the current value of the current supplied to smart phone 300 is determined depending on power supply device 400. Controller 106 obtains the current value of the current which can be supplied by power supply device 400, and stores the obtained current value in an internal memory.

Controller 106 determines whether smart phone 300 (or a certain external device that has a wireless communication capability) has come within a communication area in which smart phone 300 can communicate with information notifying device 100 (S2). If controller 106 determines that smart phone 300 is not within the communication area (NO in step S2), controller 106 repeats the process of step S2 at regular time intervals. When smart phone 300 is carried into the transportation equipment, smart phone 300 and the information notifying device in the transportation equipment come to a condition being located within the communication area in which an electric wave for wireless communication from each of them reaches the other. If controller 106 determines that smart phone 300 is within the communication area (YES in step S2), controller 106 carries out a process for establishing a wireless connection with smart phone 300 (S3).

After the process for wireless connection with smart phone 300 has been completed, controller 106 first communicates with smart phone 300 to obtain total battery capacity information (S4).

Next, controller 106 confirms whether it is now a determination timing to determine whether to charge smart phone 300 which is being connected by the wireless connection (S5). If controller determines that it is not the determination timing now (NO in step S5), controller 106 repeats the process of step S5 at regular time intervals. Occurrences of the determination timing at regular time intervals make it possible to quickly respond to a rapid change in the remaining battery capacity. However, the determination timing may not be at regular time intervals, but may be a time when a state of an operation function of smart phone 300 has been changed, or, for example, when an application operated by smart phone 300 has been changed to another. In this case, smart phone 300 may be requested to notify information notifying device 100 of the determination timing. Further, the determination timing may be a combination of time and the operation function. For example, the determination timing may be started when the operation function of smart phone 300 has been changed, and may thereafter be repeated at regular time intervals.

If controller 106 determines that it is now the determination timing (YES in step S5), controller 106 communicates with smart phone 300 to obtain remaining battery capacity information (S6). After controller 106 obtained the remaining battery capacity information from smart phone 300, controller 106 (charging amount estimating unit 108) estimates, as a charging amount, a battery capacity having been used, or a battery capacity that can be replenished by recharging, from the total battery capacity information and the remaining battery capacity information (S7).

Next, controller 106 obtains the estimated destination arrival time and the current time, and, based on these time information, estimates a charging available time for charging smart phone 300 (S8). More specifically, controller 106 obtains the estimated arrival time from server 200. Also, controller 106 obtains the current time from clock 105. Controller 106 (charging available time estimating unit 109*a* in determining unit 109) calculates a difference between the estimated arrival time and the current time. This difference is the remaining moving time before arriving at the destination. In other words, the remaining moving time is the time during when the battery of smart phone 300 can be charged.

Next, controller 106 (charging time estimating unit 109*b* in determining unit 109) estimates a charging time based on the charging amount and the current value (S10). In other words, controller 106 calculates, as the charging time, an estimated time it would take to recover the fully charged state if the battery capacity to be replenished by charging is charged by the current value which can be supplied by power supply device 400.

Controller 106 (comparing unit 109*c* in determining unit 109) compares the charging time to the charging available time (S11). Controller 106 adds short margin $\alpha$ to the charging time, and, if controller 106 determines that the charging time+$\alpha$ is longer than the charging available time (YES in S11), outputs reminder information to the outside (S12). In other words, controller 106 determines, as the first timing, a timing at which the current time is before passing the time counted back the charging time from the estimated arrival time, and outputs the reminder information at the first timing to the outside. The first timing corresponds to the time when it is determined that the charging time+$\alpha$ is longer than the charging available time in step S11. The first timing is a timing to advise the user to begin charging (the battery of) smart phone 300. In other words, the first timing is also a timing necessary to begin charging (the battery of) smart phone 300.

On the other hand, if controller 106 determines that the time defined as "the charging time+$\alpha$" is equal to or shorter than the charging available time (NO in S11), controller 106 repeats the processes from step S5 to step S11. Addition of appropriate margin $\alpha$ depending on the interval of the determination timings to the charging time allows the reminder information to be output during when the charging time is shorter than the charging available time, and also prevents occurrence of the condition of "the charging time>the charging available time", which may otherwise possibly occur depending on the determination timing. For example, if margin $\alpha$ is shorter than the interval of the determination timings, such a case may possibly occur that, while the condition determined at the previous determination timing was "the charging time+$\alpha$<the charging available time", the condition determined at the present determination timing is "the charging time>the charging available time". Meanwhile, if margin $\alpha$ is equal to or longer than the interval of the determination timings, the above case can be prevented. In the manner as described above, controller 106 can output the reminder information for the user before the charging time becomes longer than the charging available time.

1-3. Advantageous Effects and so on

As described above, according to the present exemplary embodiment, information notifying device 100 includes first communication circuit 103, second communication circuit 104, clock 105, and controller 106. First communication circuit 103 receives the first information regarding the estimated arrival time at which the transportation equipment will arrive at the destination. Second communication circuit 104 receives the second information regarding the remaining battery capacity of the battery installed in smart phone 300. Clock 105 keeps the current time. Controller 106 calculates the first charging time required for charging smart phone 300 to the fully charged state based on the second information, and outputs the reminder information prompting to charge smart phone 300 at the first timing based on the first information, the current time and the first charging time.

With the above configuration, the user of smart phone 300 can know from the reminder information the last moment from which the user will be able to charge smart phone 300 to the fully charged state by utilizing the remaining time until arriving of the transportation equipment at the destination, or the last timing after which, even if the user begins charging, the user might, as a possibility, not be able to charge smart phone 300 to the fully charged state. Accordingly, information notifying device 100 is effective to prevent smart phone 300 from causing shortage of the remaining battery capacity which might otherwise occur after arrival of the transportation equipment at the destination.

Second Exemplary Embodiment

An information notifying device in accordance with a second exemplary embodiment of the present disclosure will be described with reference to FIG. 5 and FIG. 6.

2-1. Configuration

The second exemplary embodiment differs from the first exemplary embodiment in the configurations of the controller and the power supply device, and is almost the same as the first exemplary embodiment in the other configurations. Therefore, the following description will be made mainly on the contents that are different from those of the first exemplary embodiment, and duplicating description on the similar parts as those of the first exemplary embodiment will be omitted.

Figure 5:
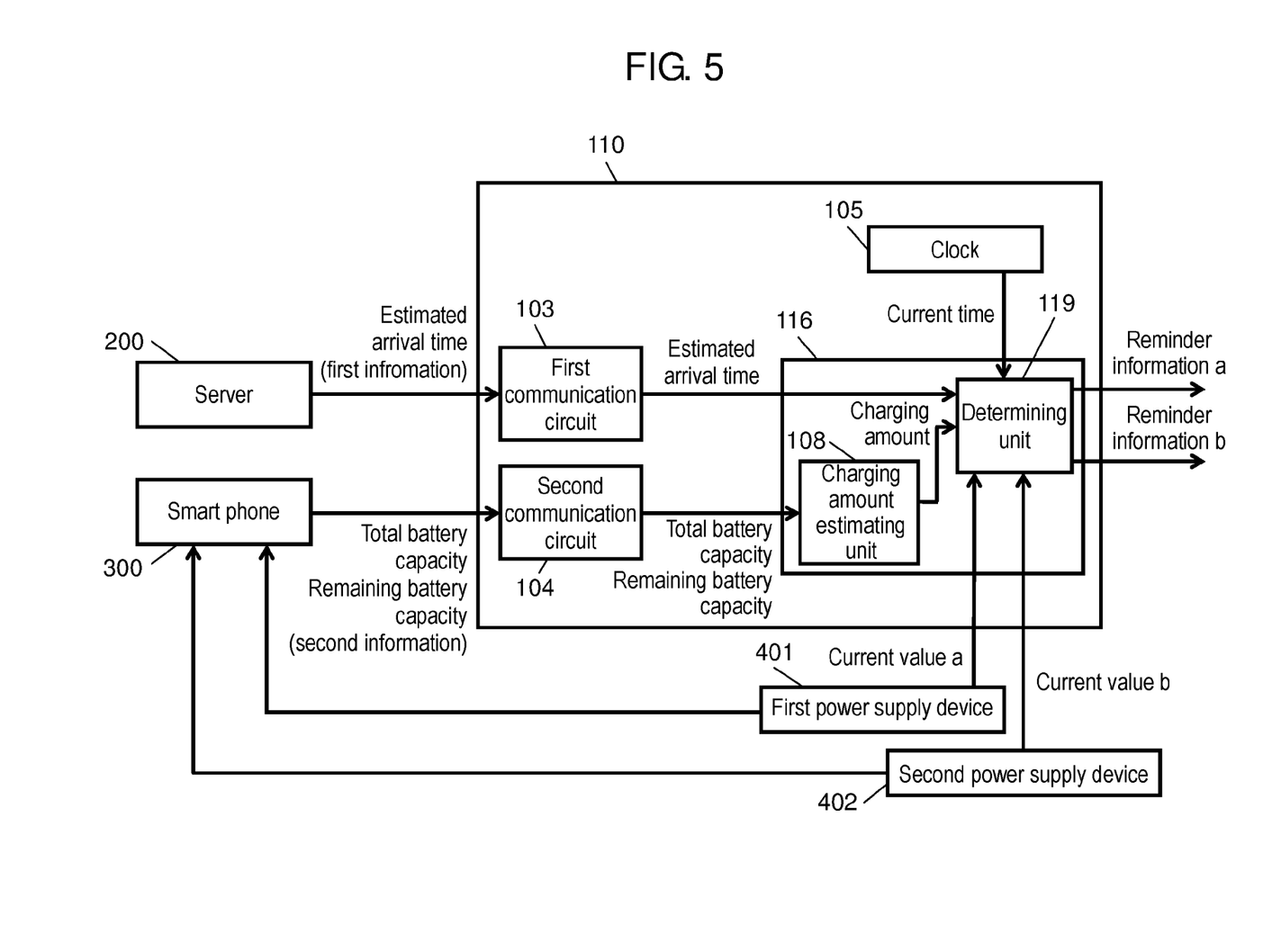
FIG. 5 is a block diagram illustrating an electrical configuration of an information notifying device in accordance with a second exemplary embodiment.

FIG. 5 is a block diagram illustrating an electrical configuration of information notifying device 110 in accordance with the present exemplary embodiment. Information notifying device 110 includes first communication circuit 103, second communication circuit 104, clock 105, and controller 116. Information notifying device 110 is connected by a wired connection to server 200 provided in the transportation equipment. Also, information notifying device 110 is connectable by a wireless connection to smart phone 300 carried by a user. Also, smart phone 300 can be charged by being connected to first power supply device 401 and/or second power supply device 402 which are provided in the transportation equipment. The present exemplary embodiment differs from the first exemplary embodiment in that, while there is one system configured by a power supply device, a charging time estimating unit and a comparing unit in the first exemplary embodiment, there are two systems each configured by a power supply device, a charging time estimating unit and a comparing unit in the present exemplary embodiment.

First Power Supply Device, Second Power Supply Device

First power supply device 401 and second power supply device 402 are provided in the transportation equipment. First power supply device 401 and second power supply device 402 respectively notify controller 116 of information notifying device 110 of current value a which can be supplied by first power supply device 401 and current value b which can be supplied by second power supply device 402. First power supply device 401 and second power supply device 402 can be connected to smart phone 300 by different connection methods from each other to supply power to smart phone 300. The different connection methods from each other may be those different in the current value (power) that can be supplied, those different in that one is the wired connection and the other is the wireless connection, or those different in the technical standard or in the version of a technical standard. For example, one of first power supply device 401 and second power supply device 402 may be connected by using a wired connection, and the other may be connected by using a wireless connection. Also, both of first power supply device 401 and second power supply device 402 may be connected by wired connections, one complying with USB 2.0, and the other complying with USB 3.0. Also, both of first power supply device 401 and second power supply device 402 may be connected by wireless connections, one complying with Qi recommended by WPC (Wireless Power Consortium), and the other complying with the PMA (Power Matters Alliance) standard. First power supply device 401 is an example of a first power supply. Current value a is an example of first power information regarding capability of supplying power to an external device. Second power supply device 402 is an example of a second power supply. Current value b is an example of second power information regarding capability of supplying power to an external device.

Some transportation equipment prepares plural kinds of power supply units for supplying power so as to provide plural kinds of power supply methods suited to different user's tastes. For example, as power supplying methods using a USB cable, there are a method provided with a USB port that can supply a charge current of up to 500 mA by using USB 2.0, a method provided with a USB port that can supply a charge current of 500 mA or more to enable quicker charging than USB 2.0, and a method provided with a plurality of USB ports such as USB 3.0. In this manner, first power supply device 401 and second power supply device 402 may be different from each other in the power supplying capability.

Controller 116

Controller 116 executes programs to operate as charging amount estimating unit 108 and determining unit 119. Controller 116 outputs information prompting the user to charge smart phone 300 at a timing (a first timing) based on the first information, the second information, the current time, and current value a. Controller 116 also outputs information prompting the user to charge smart phone 300 at a timing (a second timing) based on the first information, the second information, the current time, and current value b.

Charging amount estimating unit 108 estimates a charging amount necessary to recover the fully charged state based on the total battery capacity information and the remaining battery capacity information which have been received from second communication circuit 104, and outputs the estimated charging amount to determining unit 119.

Figure 6:
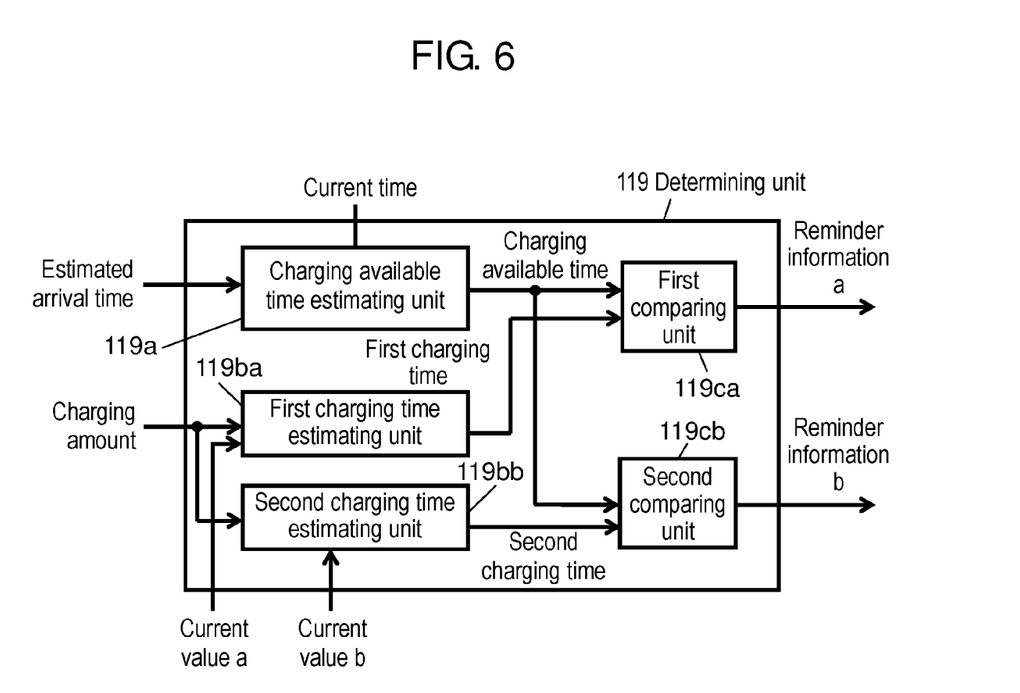
FIG. 6 is a diagram schematically illustrating functional blocks of a determining unit in accordance with the second exemplary embodiment.

FIG. 6 is a diagram schematically illustrating functional blocks of determining unit 119 in accordance with the second exemplary embodiment. As shown in FIG. 6, determining unit 119 (controller 116) operates as charging available time estimating unit 119a, first charging time estimating unit 119ba, second charging time estimating unit 119bb, first comparing unit 119ca, and second comparing unit 119cb.

First charging time estimating unit 119ba estimates a first charging time based on the charging amount information output from charging amount estimating unit 108 and current value a notified from first power supply device 401. Here, the maximum value of power that can be supplied by first power supply device 401 may be used instead of current value a.

Second charging time estimating unit 119bb estimates a second charging time based on the charging amount information output from charging amount estimating unit 108 and current value b notified from second power supply device 402. Here, the maximum value of power that can be supplied by second power supply device 402 may be used instead of current value b.

First comparing unit 119ca compares the charging available time information output from charging available time estimating unit 119a and the first charging time output from first charging time estimating unit 119ba to monitor so that the first charging time does not become longer than the charging available time. Also, first comparing unit 119ca outputs reminder information a for notifying the user of information advising the user to begin charging smart phone 300 by connecting it to first power supply device 401 at a timing (the first timing) before a time at which the first charging time exceeds the charging available time.

Second comparing unit 119cb compares the charging available time information output from charging available time estimating unit 119a and the second charging time output from second charging time estimating unit 119bb to monitor so that the second charging time does not become longer than the charging available time. Also, second comparing unit 119cb outputs reminder information b for notifying the user of information advising the user to begin charging smart phone 300 by connecting it to second power supply device 402 at a timing (the second timing) before a time at which the second charging time exceeds the charging available time.

2-2. Operations

Next, operations of information notifying device 110 of the present exemplary embodiment will be described. Operations of information notifying device 110 in the present exemplary embodiment are basically the same as those of information notifying device 100 in the first exemplary embodiment. However, while there is one system configured by a power supply device, a charging time estimating unit and a comparing unit in the first exemplary embodiment, there are two systems each configured by a power supply device, a charging time estimating unit and a comparing unit. Accordingly, controller 116 operates to process each of estimation of the first charging time followed by output of reminder information a based on the estimation result and estimation of the second charging time followed by output of reminder information b based on the corresponding estimation result independently of the other.

2-3. Advantageous Effects and so on

As described above, according to the present exemplary embodiment, information notifying device 110 includes first communication circuit 103, second communication circuit 104, clock 105, and controller 116. First communication circuit 103 receives the first information regarding the estimated arrival time at which the transportation equipment will arrive at the destination. Second communication circuit 104 receives from smart phone 300 the second information regarding the remaining battery capacity of the battery installed in smart phone 300. Clock 105 keeps the current time. Controller 116 calculates the first charging time required for charging smart phone 300 to the fully charged state based on the second information and the first power information. The first power information is information regarding the capability to supply power to smart phone 300 of first power supply device 401, which can be used to charge smart phone 300. Controller 116 outputs information prompting to charge smart phone 300 at the first timing based on the first information, the current time and the first charging time. Controller 116 calculates the second charging time required for charging smart phone 300 to the fully charged state based on the second information and the second power information. The second power information is information regarding the capability to supply power to smart phone 300 of second power supply device 402, which can be used to charge smart phone 300. Controller 116 outputs information prompting to charge smart phone 300 at the second timing based on the first information, the current time and the second charging time.

With the above configuration, the user of smart phone 300 can know the last moment from which the user will be able to charge smart phone 300 to the fully charged state by utilizing the remaining time until arriving of the transportation equipment at the destination, or the timing after which, even if the user begins charging, the user might, as a possibility, not be able to charge smart phone 300 to the fully charged state. Also, the user can know this timing with respect to each of a plurality of charging methods. Accordingly, information notifying device 110 is effective to prevent smart phone 300 from causing shortage of the remaining battery capacity after arrival of the transportation equipment at the destination.

Other Exemplary Embodiments

In the above description, first and second exemplary embodiments have been described as examples of techniques disclosed in the present application. However, the techniques according to the present disclosure are not limited to the above-described exemplary embodiments, and may be applied to other exemplary embodiments in which modifications, substitutions, additions, and/or omissions are made. Also, the structural components described in the above first and second exemplary embodiments may be appropriately combined to configure a new exemplary embodiment.

Examples of other exemplary embodiments will be described below.

In the above exemplary embodiments, such a configuration has been described that a server located outside of the transportation equipment estimates the time at which the transportation equipment will arrival at the destination, and provides the first information to first communication circuit 103 by using a wired connection. However, first communication circuit 103 may be capable of communicating by using a wireless connection. That is, it may be configured such that the server provides the first information to first communication circuit 103 by using a wireless connection. In the above exemplary embodiments, such a configuration has been described that a server outputs the first information to first communication circuit 103. However, smart phone 300 may output the first information to first communication circuit 103. Some smart phones that can be used as smart phone 300 are equipped with a GPS, and have a navigation function. Smart phone 300 having such a function can play a role as server 200. That is, smart phone 300 may outputs, as the first information, information of the estimated arrival time to first communication circuit 103 by using a wireless communication.

In the above exemplary embodiments, such a configuration has been described that the information notifying device estimates the charging amount by using the total battery capacity and outputs the reminder information so that the battery will be made a fully charged state before arriving at the destination. However, the information notifying device may not use the total battery capacity as the value of the fully charge state, but may use a value which is several percent smaller than the total battery capacity instead of using the total battery capacity. It is expected by this configuration to obtain such an advantageous effect that the battery can be charged without putting a strain on the battery, because degradation of the lithium-ion batteries, which are widely used for smart phones and the like, is accelerated if they are kept in the fully charged state.

In the above exemplary embodiments, such a configuration has been described that the power supply device is provided separately from the information notifying device in the transportation equipment. However, the power supply device may be provided in the information notifying device.

In the above exemplary embodiments, such a configuration has been described that the power supply device notifies the information notifying device of the current value, as the information regarding its power supplying capability to an external device. However, the information notifying device may previously store in a memory the current value obtained from the power supply device.

In the above exemplary embodiments, such a configuration has been described that the power supply device directly supplies power to an external device. However, the power supply device may supply power to the external device through the information notifying device. In other words, the information notifying device may operate itself by the power supplied from the power supply device, and also supply a part of the power to an external device connected to the information notifying device to charge the external device.

In the above exemplary embodiments, such a configuration has been described that the controller (the charging time estimating unit) obtains the current value from the power supply device. However, the charging time estimating unit only has to know information regarding a maximum current (power) the power supply device can supply. Accordingly, the charging time estimating unit may measure the current supplied from the power supply device to obtain the current value as an actual measured value.

In a case where information notifying device 110 is unable to know that smart phone 300 is compatible with plural kinds of charging methods in the second exemplary embodiment, information notifying device 110 may provide the reminder information with respect to each of a plurality of power supplying methods. On the other hand, in a case where information notifying device 110 is able to know the charging method available by smart phone 300 based on a notification from smart phone 300, information notifying device may provide only the reminder information corresponding to the compatible power supply. In this case, it is possible to provide only the information necessary for the user, without providing information unnecessary for the user. Also, information notifying device 110 may output only a piece of reminder information which is to be notified at the latest timing among a plurality of pieces of reminder information. This is advantageous in that the minimum necessary information can be provided to the user.

In a case where the user is charging smart phone 300 in a power supplying method according to some reminder information in the second exemplary embodiment, information notifying device 110 may be configured so as not to output additional reminder information corresponding to another power supplying method.

In the second exemplary embodiment, the plurality of power supply devices, which supply power in different methods from one another, may not be installed in a same place, and may be installed in separate places from one another.

In the second exemplary embodiment, it has been described that a number of power supply devices is two. However, the number of power supply devices with respect to which the information notifying device determines the output of the reminder information may not be limited to two. The information notifying device may determine outputs of the reminder information with respect to more than two power supply devices, and may output the same number of pieces of reminder information to the user.

It should be understood that the exemplary embodiments have been described for the purpose to merely show examples of the techniques in accordance with the present disclosure, and that various modifications, substitutions, additions and/or omissions may be made within the scope of the appended claims and equivalents thereof.

The information notifying device of the present disclosure is effective to prevent shortage of remaining battery capacity of an external device after arrival of transportation equipment at a destination, and is therefore applicable to information notifying devices provided in transportation equipment.

What is claimed is:

1. An information notifying device comprising:
  a first communication circuit that receives first information regarding an estimated arrival time at which transportation equipment will arrive at a destination;
  a second communication circuit that receives second information regarding a remaining capacity of a battery installed in an external device;
  a clock that keeps a current time; and
  a controller that calculates a first charging time necessary to fully charge the battery of the external device based on the second information, and outputs information prompting to charge the battery of the external device at a first timing based on the first information, the current time and the first charging time,
  wherein the controller calculates the first charging time based on the second information and first power information regarding a capability of a first power supply, which charges the external device, to supply power to the external device.

2. The information notifying device according to claim 1, wherein the second information includes information regarding a full battery capacity of the battery, and information regarding a remaining battery capacity of the battery.

3. The information notifying device according to claim 1, wherein the second communication circuit obtains the second information by using a wireless communication.

4. The information notifying device according to claim 1, wherein the controller sets, as the first timing, a timing before the current time passes a time counted back by the first charging time from the estimated arrival time indicated by the first information.

5. The information notifying device according to claim 1, wherein the controller calculates a second charging time based on the second information and second power information regarding a capability of a second power supply, which charges the external device, to supply power to the external device, and outputs information prompting to charge the external device at a second timing based on the first information, the current time and the second charging time.

6. The information notifying device according to claim 5, wherein the first power supply and the second power supply are connectable to the external device in different methods from each other.

7. The information notifying device according to claim 5, wherein the first power supply and the second power supply are different in power supplying capability from each other.

8. The information notifying device according to claim 5, wherein one of the first power supply and the second power supply is connectable to the external device by using a wired connection, and the other of the first power supply and the second power supply is connectable to the external device by using a wireless connection.

9. An information notifying device comprising:
   a clock that indicates a current time; and
   a controller that:
      obtains first information regarding an estimated arrival time at which transportation equipment will arrive at a destination;
      obtains second information regarding a remaining capacity of a battery installed in an external device;
      calculates a first charging time necessary to fully charge the battery of the external device based on the second information; and
      outputs information prompting to charge the battery of the external device at a first timing based on the first information, the current time and the first charging time,
   wherein the controller calculates the first charging time based on the second information and first power information regarding a capability of a first power supply, which charges the external device, to supply power to the external device.

10. The information notifying device according to claim 9, wherein the second information includes information regarding a full battery capacity of the battery, and information regarding a remaining battery capacity of the battery.

11. The information notifying device according to claim 9, further comprising communication circuitry for a wireless communication,
   wherein the controller obtains the second information through the communication circuitry.

12. The information notifying device according to claim 9, wherein the controller sets, as the first timing, a timing before the current time passes a time counted back by the first charging time from the estimated arrival time indicated by the first information.

13. The information notifying device according to claim 9, wherein the controller calculates a second charging time based on the second information and second power information regarding a capability of a second power supply, which charges the external device, to supply power to the external device, and outputs information prompting to charge the external device at a second timing based on the first information, the current time and the second charging time.

14. The information notifying device according to claim 13, wherein the first power supply and the second power supply are connectable to the external device in different methods from each other.

15. The information notifying device according to claim 13, wherein the first power supply and the second power supply are different in power supplying capability from each other.

16. The information notifying device according to claim 13, wherein one of the first power supply and the second power supply is connectable to the external device by using a wired connection, and the other of the first power supply and the second power supply is connectable to the external device by using a wireless connection.

* * * * *